United States Patent
Sakagami et al.

(10) Patent No.: US 8,949,634 B2
(45) Date of Patent: Feb. 3, 2015

(54) STORAGE DEVICE CONNECTED TO A SUPERIOR DEVICE AND METHOD OF SUPPLYING POWER TO THE STORAGE DEVICE

(75) Inventors: Yuichi Sakagami, Kawasaki (JP); Nina Tsukamoto, Kawasaki (JP); Oumar Thielo, Kawasaki (JP); Nobuyuki Honjo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 651 days.

(21) Appl. No.: 12/318,525

(22) Filed: Dec. 30, 2008

(65) Prior Publication Data

US 2009/0271640 A1 Oct. 29, 2009

(30) Foreign Application Priority Data

Apr. 25, 2008 (JP) .................................. 2008-115902

(51) Int. Cl.
*G06F 1/32* (2006.01)
*G06F 1/26* (2006.01)

(52) U.S. Cl.
CPC ................ *G06F 1/26* (2013.01); *G06F 1/3203* (2013.01)
USPC ............................. 713/310; 713/330; 365/227

(58) Field of Classification Search
CPC ..... G06F 1/266; G06F 1/3203; G06F 1/3206; Y02B 60/1282
USPC .................................. 713/310, 330; 365/227
See application file for complete search history.

(56) References Cited

U.S. PATENT DOCUMENTS

| 7,225,353 | B1 * | 5/2007 | Wong .............................. | 713/340 |
|---|---|---|---|---|
| 7,395,440 | B2 * | 7/2008 | Nokkonen ..................... | 713/300 |
| 7,634,615 | B2 * | 12/2009 | Sutardja ......................... | 711/112 |
| 7,765,415 | B2 * | 7/2010 | Ishikura et al. ............... | 713/310 |
| 7,783,802 | B1 * | 8/2010 | Nemazie et al. ................ | 710/74 |
| 7,814,245 | B2 * | 10/2010 | Schauer .......................... | 710/62 |
| 8,086,775 | B2 | 12/2011 | Honda | |
| 8,359,407 | B2 * | 1/2013 | Van Bebber ....................... | 710/7 |
| 2007/0192637 | A1 | 8/2007 | Kubo et al. | |
| 2008/0126616 | A1 | 5/2008 | Kumasawa et al. | |

FOREIGN PATENT DOCUMENTS

| JP | 5-61573 | 3/1993 |
|---|---|---|
| JP | 11-205412 | 7/1999 |
| JP | 2000-253035 | 9/2000 |

(Continued)

OTHER PUBLICATIONS

JP-2004-356664—English-language Translation.*

(Continued)

*Primary Examiner* — Thuan Du
(74) *Attorney, Agent, or Firm* — Fujitsu Patent Center

(57) ABSTRACT

An OOB sequence monitoring unit detects that an OOB sequence carried out between a base device as a superior device and a connection I/F which operates even if an extension device is in a standby state has proceeded to a given stage. Based on the detection by the OOB sequence monitoring unit, a power supply control unit instructs a starting power supply unit to supply power. When the extension device starts, the OOB sequence is carried out between the extension device and the connection I/F of another extension device in the same manner. As a result, extension devices are started in decreasing order from the extension device closest to the superior device.

17 Claims, 9 Drawing Sheets

(56) References Cited

FOREIGN PATENT DOCUMENTS

| | | |
|---|---|---|
| JP | 2001-339853 | 12/2001 |
| JP | 2004-356664 A | 12/2004 |
| JP | 2007-4587 A | 1/2007 |
| JP | 2007-213584 | 8/2007 |
| JP | 2007-233998 A | 9/2007 |
| JP | 2008-041050 | 2/2008 |
| JP | 2008-71005 A | 3/2008 |

OTHER PUBLICATIONS

Japanese Office Action issued Dec. 14, 2010 in corresponding Japanese Patent Application 2008-115902.

Japanese Office Action issued Apr. 13, 2010 in corresponding Japanese Patent Application 2008-115902.

Japanese Office Action mailed Jul. 24, 2012 for corresponding Japanese Application No. 2011-168746, with English-language Translation.

* cited by examiner

STORAGE DEVICE CONNECTED TO A SUPERIOR DEVICE AND METHOD OF SUPPLYING POWER TO THE STORAGE DEVICE

CROSS-REFERENCE TO RELATED APPLICATIONS

This application is based upon and claims the benefit of priority of the prior Japanese Patent Application No. 2008-115902, filed on Apr. 25, 2008, the entire contents of which are incorporated herein by reference.

BACKGROUND

1. Field

The present invention relates to a storage device that is connected to a superior device via a given interface, and to a method of starting the storage device.

2. Description of the Related Art

A conventional storage system offering a large memory or storage capacity has been in use. In this storage system, a storage device (hereinafter, "extension device") for providing an additional storage medium is connected to a storage device (hereinafter, "base device") having a storage medium plus a controller controlling external access thereto to achieve large memory capacity.

Extension devices are connected in series in such a way that a first extension device is connected to a base device and a second extension device is connected to the first extension device.

To operate such a storage system normally, an operator must start the base device first, and then start the extension devices in decreasing order from the extension device closest to the base device.

Specifically, the operator operates the storage system normally by pressing power switches disposed on the bodies of the base device and the extension devices in order without fail. If, for example, the operator forgets to press a power switch of any extension device in the course of start operation, the extension devices are not started in order. As a result, the base device recognizes only some of the extension devices, so that the storage system does not operate normally.

When a number of extension devices are connected to the base device, the above operation is extremely burdensome to the operator.

To reduce burden on the operator, various methods of starting the storage system with a simple procedure have been suggested.

For example, a method has been suggested such that, in a body incorporating storage media therein, at which location a storage medium is incorporated is detected, and that the order of power supply is determined based on a detection result and a preset algorithm to supply power according the determined order (see, e.g., Japanese Patent Application Laid-open No. 2007-213584).

According to the above conventional method, however, each device is started in an order that is determined based on the position of incorporation of the storage medium. As a result, the extension device closest to the base device is not necessarily started first in starting extension devices in order, which leads to the problem that the storage system does not operate normally.

SUMMARY

It is an object of the present invention to at least partially solve the problems in the conventional technology.

According to an aspect of an embodiment, a storage device connected to a superior device via an interface, includes a power supply unit that supplies power for starting the storage device; a communication control unit that operates with power supplied from a standby power source supplying power partially to the storage device, and controls communication with the superior device that is carried out via the interface; a detecting unit that operates with power supplied from the standby power source, and detects that an initializing sequence carried out between the superior device and the interface has proceeded to a given stage; and a power supply instructing unit that operates with power supplied from the standby power source, and instructs the power supply unit to supply power, based on the detection by the detecting unit.

According to another aspect of an embodiment, a method for starting a storage device connected to a superior device via an interface, includes detecting that an initializing sequence carried out between the storage device and a started superior device has proceeded to a given stage when the storage device is in a standby state where the storage device is partially supplied with power; and instructing a power source supplying power for starting the storage device to supply power, based on the detection.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE PREFERRED EMBODIMENTS

Exemplary embodiments of an extension device according to the technique of the present disclosure will now be described in detail with reference to the accompanying drawings.

Figure 1:
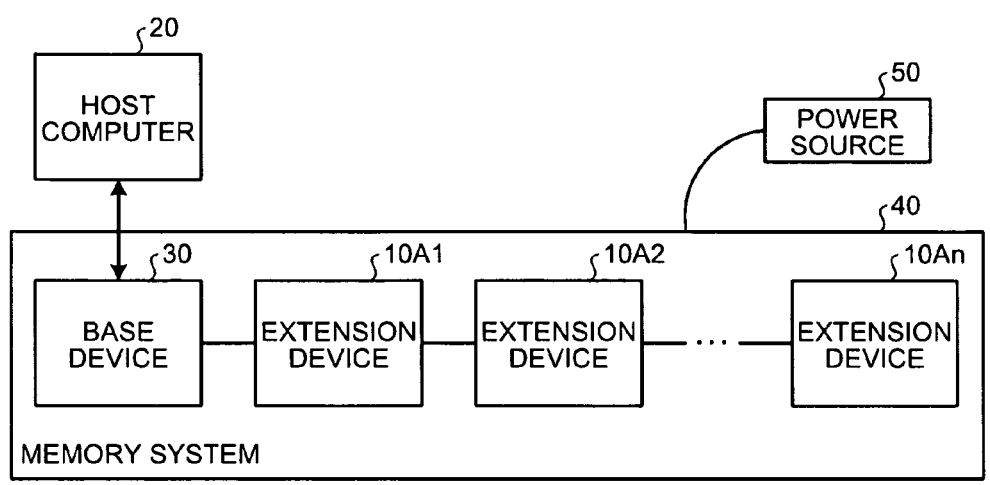
FIG. 1 is an explanatory view of a scheme of an extension device.

A schematic of the extension device will first be described referring to FIG. 1. FIG. 1 is an explanatory view of the scheme of the extension device.

As shown in FIG. 1, extension devices 10A1 to 10An are connected in series to a base device 30 that controls external access thereto. The extension devices 10A1 to 10An, together with the base device 30, make up a storage system 40. For example, a host computer 20 is connected to the base device 30.

The base device 30 and the extension devices 10A1 to 10An are partially supplied with power to be in a standby state even when, for example, the storage system 40 is connected to an external power source 50. Each device starts in given timing when a power switch disposed on the body of the device is pressed, but remains in the standby state until starting up.

Figure 2:
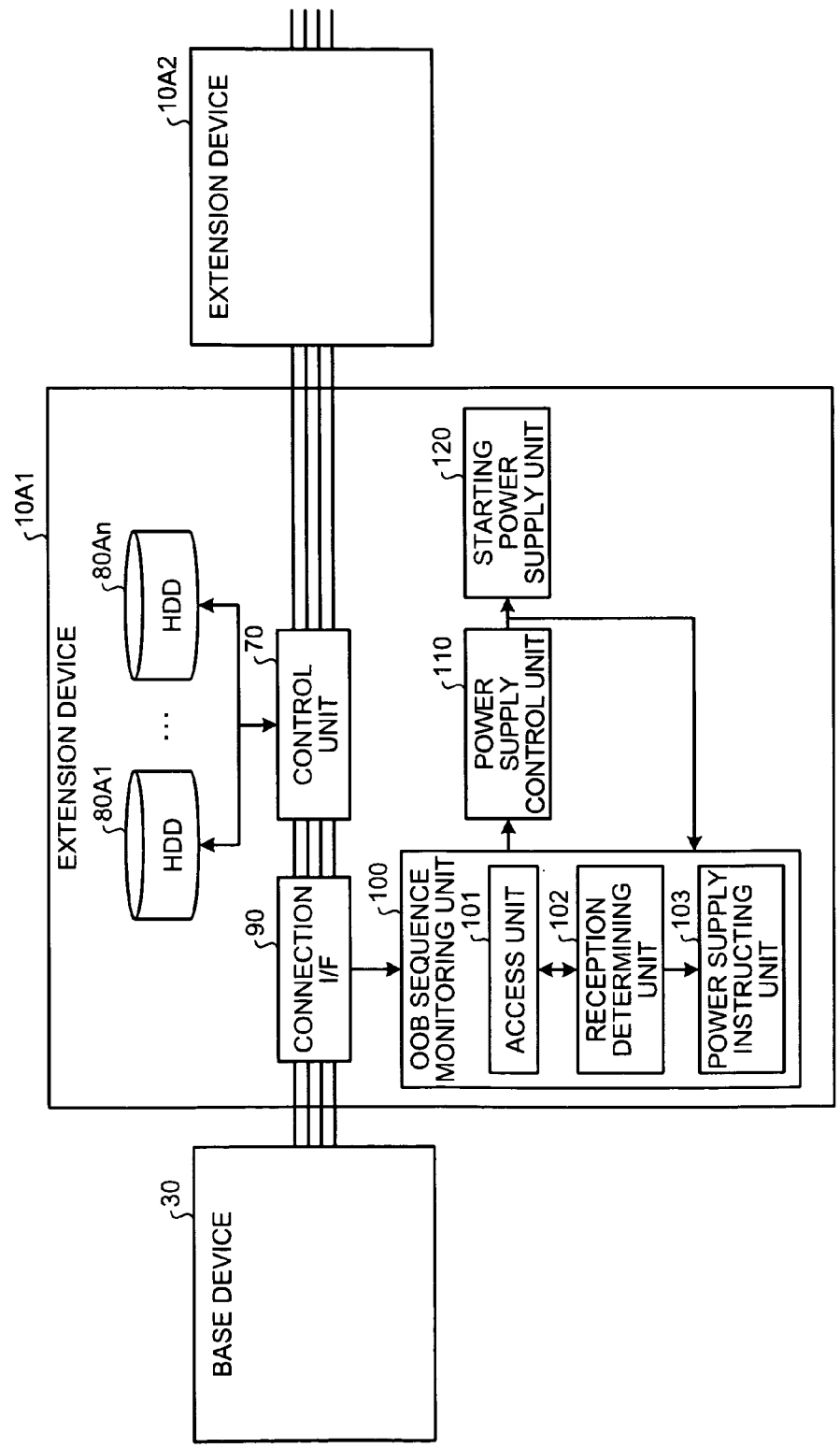
FIG. 2 is a block diagram of a configuration of an extension device according to a first embodiment.

A configuration of the extension device of the first embodiment will then be described referring to FIG. 2. Because all of the extension devices 10A1 to 10An have the same configuration, the configuration of the extension device 10A1 representing all extension devices will be described. FIG. 2 is a block diagram of the configuration of the extension device according to the first embodiment.

As shown in FIG. 2, the extension device 10A1 is connected to the base device 30, which is a superior device, and to the extension device 10A2, which is a subordinate device, so that the extension device 10A1 can communicate with both base device 30 and extension device 10A2. In the present embodiment, a cable used for connection between those devices is, for example, a multilane cable consisting of four data lanes.

The extension device 10A1 includes a control unit 70, HDDs (Hard Disc Drive) 80A1 to 80An, a connection I/F (interface unit) 90 conforming to the SAS (Serial Attached SCSI) standard, an OOB (Out Of Band) sequence monitoring unit 100, a power supply control unit 110, and a starting power supply unit 120. The connection I/F 90, the OOB sequence monitoring unit 100, and the power supply control unit 110 are supplied with power even when the extension device 10A1 is in the standby state.

The control unit 70 controls data reading/writing on the HDDs 80A1 to 80An, and also controls communication with a superior device or subordinate device connected to the extension device 10A1 and communication between devices connected to each other via the extension device 10A1.

Specifically, when supplied with power, the control unit 70 starts based on firmware read out from a ROM (Read Only Memory), etc. As a result, the extension device 10A1 starts. Upon starting, the control unit 70 carries out an initializing sequence called OOB sequence with the extension device 10A2 subordinate to the extension device 10A1.

The OOB sequence is executed between respective devices before transmission or reception of data that is read or written from or to the HDDs. Specifically, the devices exchange a signal called COMINIT for confirming the presence of a device and a signal called COMSAS or COMWAKE for checking whether being SAS or SATA (Serial ATT).

The HDDs 80A1 to 80An receive data from the control unit 70, which is instructed by the base device 30 to write in data, to save the data.

The connection I/F 90 is a functional unit for connection to a superior device, carrying out the OOB sequence with a started superior device. Being connected to the above cable, the connection I/F 90 has four ports as physical configuration. The connection I/F 90 also has a register, updating the status of the register based on the use condition of each port when transmitting or receiving data and signals through the ports. For example, the connection I/F 90 receives the COMINIT during execution of the OBB sequence, and updates the status of the register based on the use condition of the ports at the time of reception of the COMINIT.

The connection I/F 90 may be provided as part of the control unit 70. However, when the connection I/F 90 is provided as an independent unit, as in the present embodiment, power consumption in the standby state can be reduced because separate power supply to the connection I/F 90 suffices.

The OOB sequence monitoring unit 100 is a processing unit that monitors the condition of the OOB sequence. The OOB sequence monitoring unit 100 has an access unit 101, a reception determining unit 102, and a power supply instructing unit 103.

The access unit 101 follows an instruction from the reception determining unit 102 to read out the status of the register of the connection I/F 90.

The reception determining unit 102 instructs the access unit 101 at given intervals to read out the status of the register of the connection I/F 90. Based on the status of the register read out by the access unit 101, the reception determining unit 102 determines the use condition of each port on the connection I/F 90. When determining based on the status of the register that two ports are occupied, the reception determining unit 102 concludes that the COMINIT from a superior device has been received. The reception determining unit 102 then outputs a control signal to the power supply instructing unit 103.

Upon receiving the control signal from the reception determining unit 102, the power supply instructing unit 103 outputs a control signal to the power supply control unit 110.

The power supply control unit 110 controls power supply to the control unit 70. Specifically, upon receiving a control signal from the OOB sequence monitoring unit 100, the power supply control unit 110 outputs a control signal to the starting power supply unit 120. The power supply control unit 110 then outputs a control signal to the OOB sequence monitoring unit 100 to instruct it to stop operating. This process avoids repeated output of control signals to the power supply control unit 110, and also eliminates a need of supplying power to the OOB sequence monitoring unit 100, thus reducing power consumption.

Upon receiving the control signal from the power supply control unit 110, the starting power supply unit 120 supplies power to the control unit 70.

Figure 3:
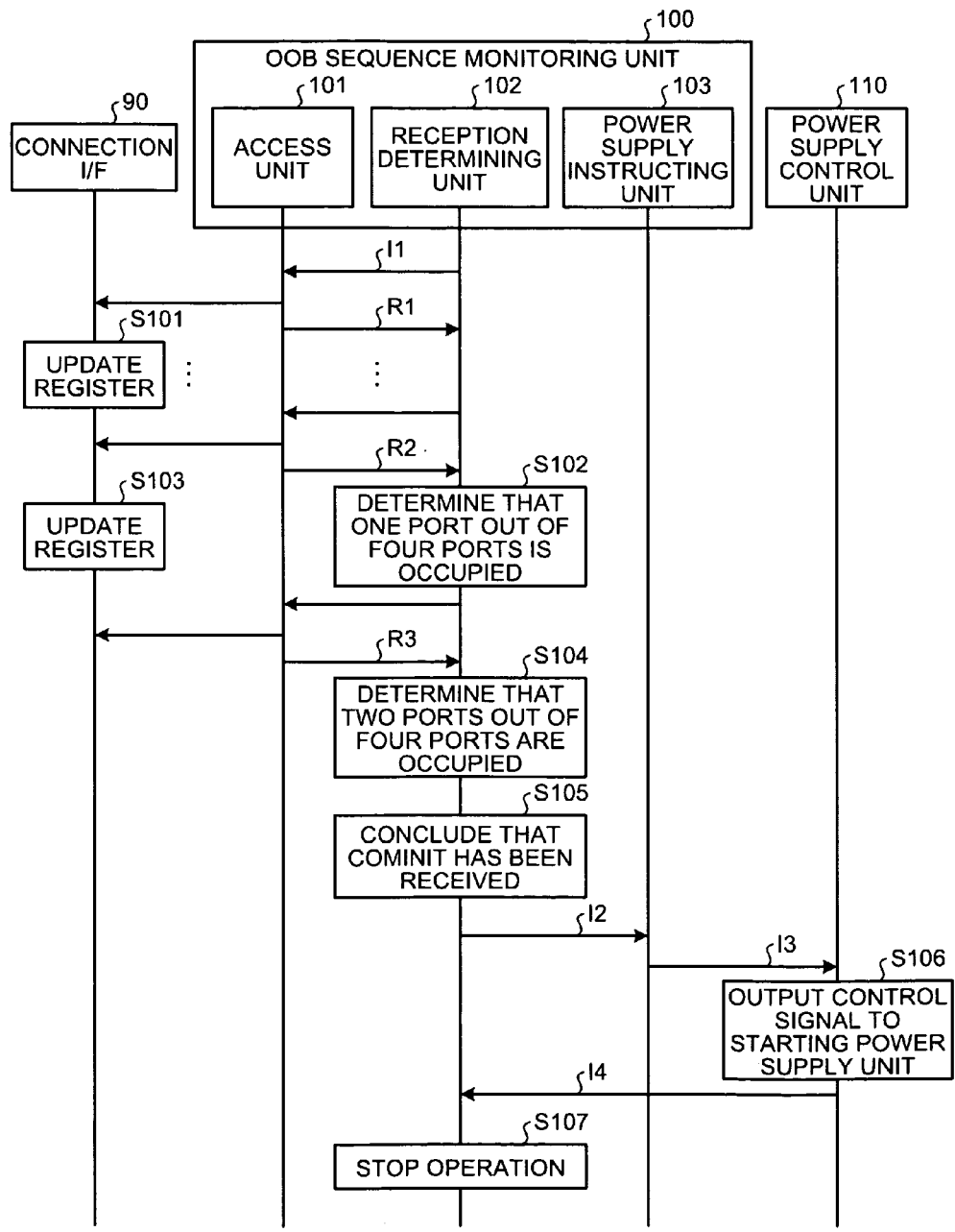
FIG. 3 is a sequence diagram of processes by respective units.

Flows of processes that are carried out by respective units until power is supplied to the control unit 70 will then be described referring to FIG. 3. FIG. 3 is a sequence diagram of processes by respective units. The units execute the processes when the extension device 10A1 is in the standby state.

At the OOB sequence monitoring unit 100, the reception determining unit 102 instructs the access unit 101 to read out the status of the register of the connection I/F 90 (I1). Responding to the instruction, the access unit 101 reads out the status of the register of the connection I/F 90, and reports a readout result (R1). Such a process is repeated at given intervals.

When the use condition of each port changes as a result of the OOB sequence carried out between the connection I/F 90 and a started superior device, the connection I/F 90 updates the status of the register based on the changed use condition (step S101).

Following the process described as step S101, the access unit 101 reads out the status of the register of the connection I/F 90 and reports a readout result (R2). Receiving the report from the access unit 101, the reception determining unit 102 determines based on the status of the register that one port out of four ports is occupied (step S102).

Then, when the use condition of each port changes as a result of the OOB sequence, the connection I/F 90 updates the status of the register based on the changed use condition (step S103).

Following the process described as step S103, the access unit 101 reads out the status of the register of the connection I/F 90 and reports a readout result (R3). Receiving the report from the access unit 101, the reception determining unit 102 determines based on the status of the register that two ports out of four ports are occupied (step S104). As a result, the reception determining unit 102 concludes that the connection I/F 90 has received the COMINIT (step S105). The reception determining unit 102 then outputs a control signal to the power supply instructing unit 103 (I2).

Upon receiving the control signal, the power supply instructing unit 103 outputs a control signal to the power supply control unit 110 (I3).

Upon receiving the control signal, the power supply control unit 110 outputs a control signal to the starting power supply unit 120 (step S106). As a result, the starting power supply unit 120, receiving the control signal, supplies power to the control unit 70. The power supply control unit 110 then outputs a control signal to the reception determining unit 102 of the OOB sequence monitoring unit 100 (I4), and the reception determining unit 102, receiving the control signal, stops its operation (step S107).

In the above sequence diagram, it is explained that the reception determining unit 102 concludes reception of the COMINIT by the connection I/F 90 as a result of determination that two ports out of four ports are occupied. This is, however, merely an instance. Other conditions for concluding reception of the COMINIT include a case of occupation of all four ports and a case of occupation of three ports out of four ports.

To the base device 30 of FIG. 1, the extension devices 10A1 to 10An having the above configuration are connected. When an operator presses a power switch disposed on the body of the base device 30, the base device 30 starts first, which is followed by the OOB sequence carried out between the started base device 30 and the connection I/F 90. Because of this, the extension device 10A1 automatically supplies power to the control unit 70 when the base device 30 is started. Then, the OOB sequence is also carried out between the started control unit 70 and the connection I/F in the extension device 10A2. As a result, the extension device 10A2 automatically supplies power to the control unit in the same manner.

The same process is performed in the extension devices following the extension device 10A2, in which extension devices power is supplied to the control units in succession. The extension devices 10A1 to 10An, therefore, can be automatically started in decreasing order from the extension device closest to the base device 30 in operation interlocking with the start of the base device 30.

In the first embodiment, an operation of automatic power supply to the control unit of the extension device is described. In a second embodiment, an operation of automatic stoppage of power supply to the control unit will be described.

Figure 4:
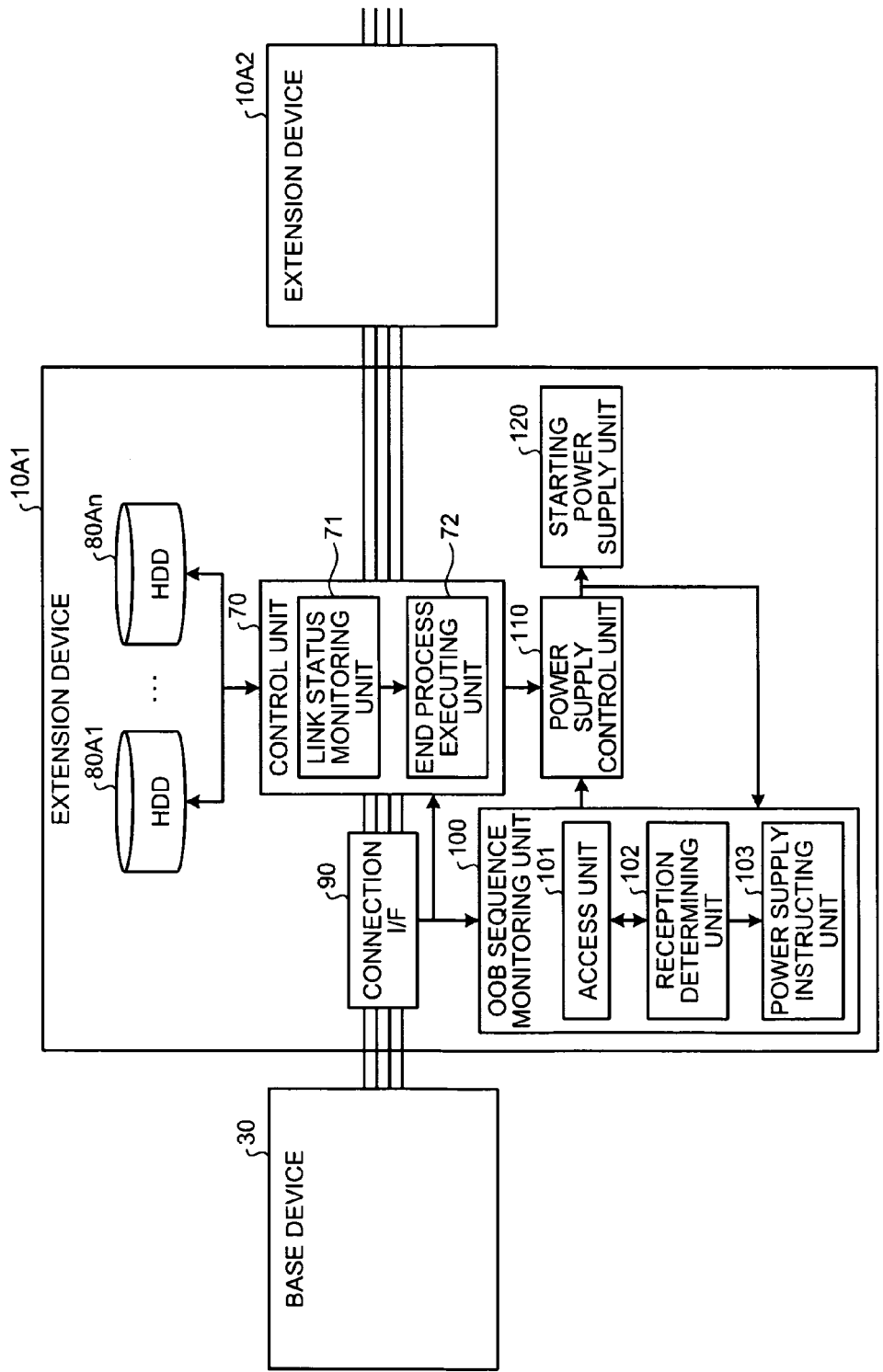
FIG. 4 is a block diagram of a configuration of an extension device according to a second embodiment.

A configuration of an extension device according to the second embodiment will be described referring to FIG. 4. FIG. 4 is a block diagram of the configuration of the extension device according to the second embodiment. The units operating in the same manner and having the same functions as described in the first embodiment will be omitted in further description. The description will be made only of the control unit 70, the power supply control unit 110, and the starting power supply unit 120.

The control unit 70 has a link status monitoring unit 71, and an end process executing unit 72.

The link status monitoring unit 71 monitors the use condition of the ports of the connection I/F 90, and determines whether all ports are unoccupied.

Specifically, the link status monitoring unit 71 reads out the status of the register of the connection I/F 90 at given intervals, and determines the use status of each port based on the read status of the register.

When determining that all ports are unoccupied, the link status monitoring unit 71 outputs a control signal giving an instruction to start an end process, to the end process executing unit 72.

Upon receiving the control signal from the link status monitoring unit 71, the end process executing unit 72 carries out the end process. Specifically, upon receiving the control signal, the end process executing unit 72 first closes all ports that are used by the control unit 70 for communication with a subordinate device.

In the ensuing course of the end process, the end process executing unit 72 carries out data backup, etc., and then outputs a control signal giving an instruction to stop power supply, to the power supply control unit 110. Receiving the control signal, the power supply control unit 110 outputs a control signal to the starting power supply unit 120. Upon receiving the control signal from the power supply control unit 110, the starting power supply unit 120 stops supplying power to the control unit 70.

Even if the ports are not closed in the end process, the ports on the connection I/F of the subordinate device become unoccupied when power supply to the control unit 70 is stopped. As a result, the control unit of the subordinate device starts the end process. In the present embodiment, however, the ports are closed in priority in the end process. This causes the control unit of the subordinate device to quickly start the end process.

Figure 5:
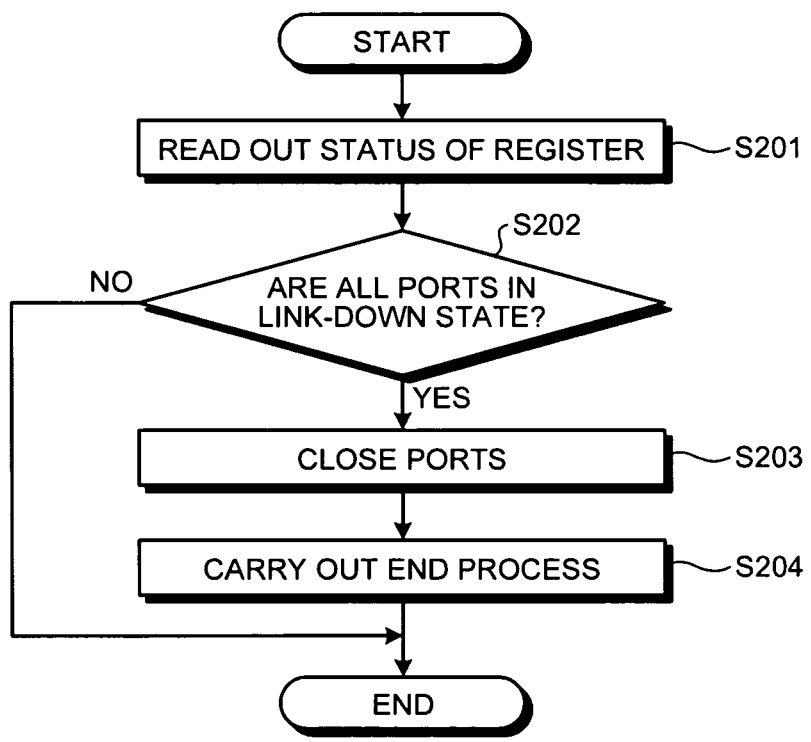
FIG. 5 is a flowchart of a flow of processes carried out by a control unit.

A processing operation carried out by the control unit 70 will then be described referring to FIG. 5. A process flow shown in FIG. 5 is executed repeatedly by the control unit 70 at given intervals.

When the control unit 70 reads out the status of the register of the connection I/F 90 (step S201), the control unit 70 determines based on the status of the register whether all ports are unoccupied (or link-down state) (step S202).

When determining that all ports are unoccupied (Yes at step S202), the control unit 70 closes the ports (step S203) and carries out the end process including data backup (step S204), and ends the process flow.

To the base device 30 of FIG. 1, the extension devices 10A1 to 10An having the above configuration are connected. When the operator presses the power switch disposed on the body of the base device 30, the base device 30 gets into the standby state. The standby state of the base device 30 leaves all ports on the connection I/F 90 of the extension device 10A1 unoccupied, thus causing the control unit 70 to automatically start the end process. Because the ports are closed in the end process by the control unit 70, all ports on the connection I/F of the extension device 10A2 become unoccupied, too. As a result, the control unit of the extension device 10A2 automatically starts the end process.

The same process happens in the extension devices following the extension device 10A2, in which extension devices power supply to the control units is stopped in succession. Power supply to the control units of the extension devices 10A1 to 10An, therefore, can be automatically stopped in decreasing order from the extension device closest to the base device 30 in operation interlocking with the standby state of the base device 30.

While embodiments of the technique of the present disclosure have been described so far, the technique of the present disclosure may be implemented in various forms of other embodiments different from the above embodiments.

First, a storage system without standby state will be explained.

In the above embodiments, the description is made on the assumption that respective devices are started from their standby state. The devices, however, may not be set in the standby state but may be set, for example, in a state of no power supply to any part of the devices and started all together from that state. For example, a start selective switch may be disposed on the body of each device to allow the user to select whether or not to set a stage of maintaining the standby state until the start of the device.

A time the control unit takes to complete the starting process is different for each device. For this reason, when a device is started using the method of not setting the stage of maintaining the standby state until the start of the device, for example, a case shown in the upper diagram of FIG. 6 may happen, in which the start of a control unit 70b of a subordinate device completes before the start of a control unit 70a of a superior device completes.

Figure 6:
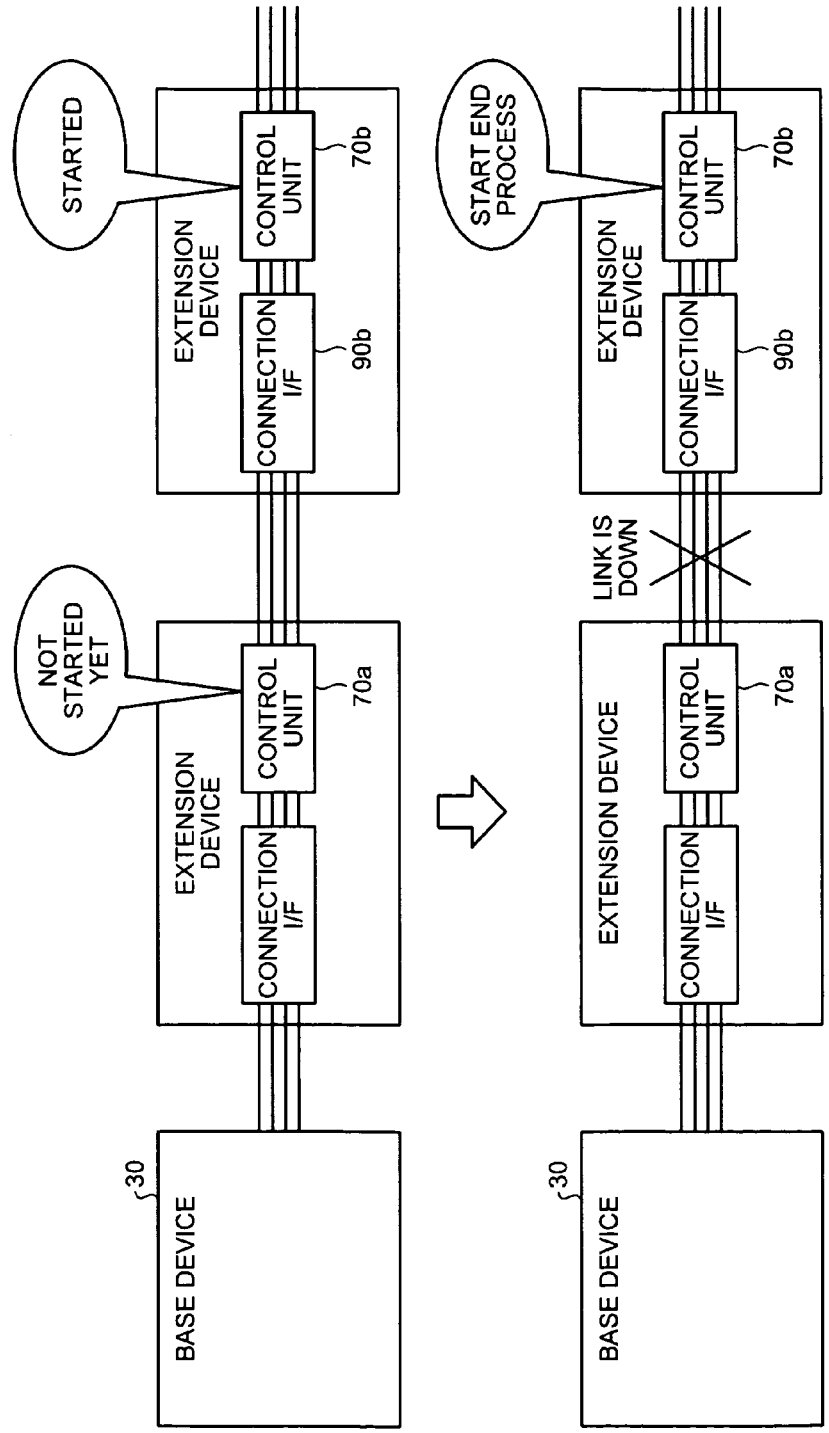
FIG. 6 is a diagram for explaining that each device takes a difference time for completing its starting process.

In this case, when the extension devices have the function described in the second embodiment, the control unit 70b determines that all ports of a connection I/F 90b are unoccupied, as shown in the lower diagram of FIG. 6. As a result, the control unit 70b starts the end process.

To prevent such a situation, each control unit may start monitoring the use condition of the ports after the passage of a given time from the completion of the starting process. Specifically, the control unit 70 is provided with a timer, in addition to the units shown in FIG. 4. The timer outputs a control signal to the link status monitoring unit 71, for example, one minute after the completion of the starting process by the control unit 70. The link status monitoring unit 71 thus starts monitoring the use status of the ports after receiving the control signal.

A base device transmitting a command will then be explained.

A specific type of base device can transmit a prescribed command to an arbitrary extension device to cause the control unit of the command-receiving extension device to execute the end process.

When the extension devices have the function described in the second embodiment, however, not only the control unit of the command-receiving extension device but also the control units of the ensuing extension devices connected to the command-receiving extension device start the end process.

To prevent such a situation, the control unit of each extension device may suspend monitoring of the use condition of the ports based on the type of a base device.

Figure 7:
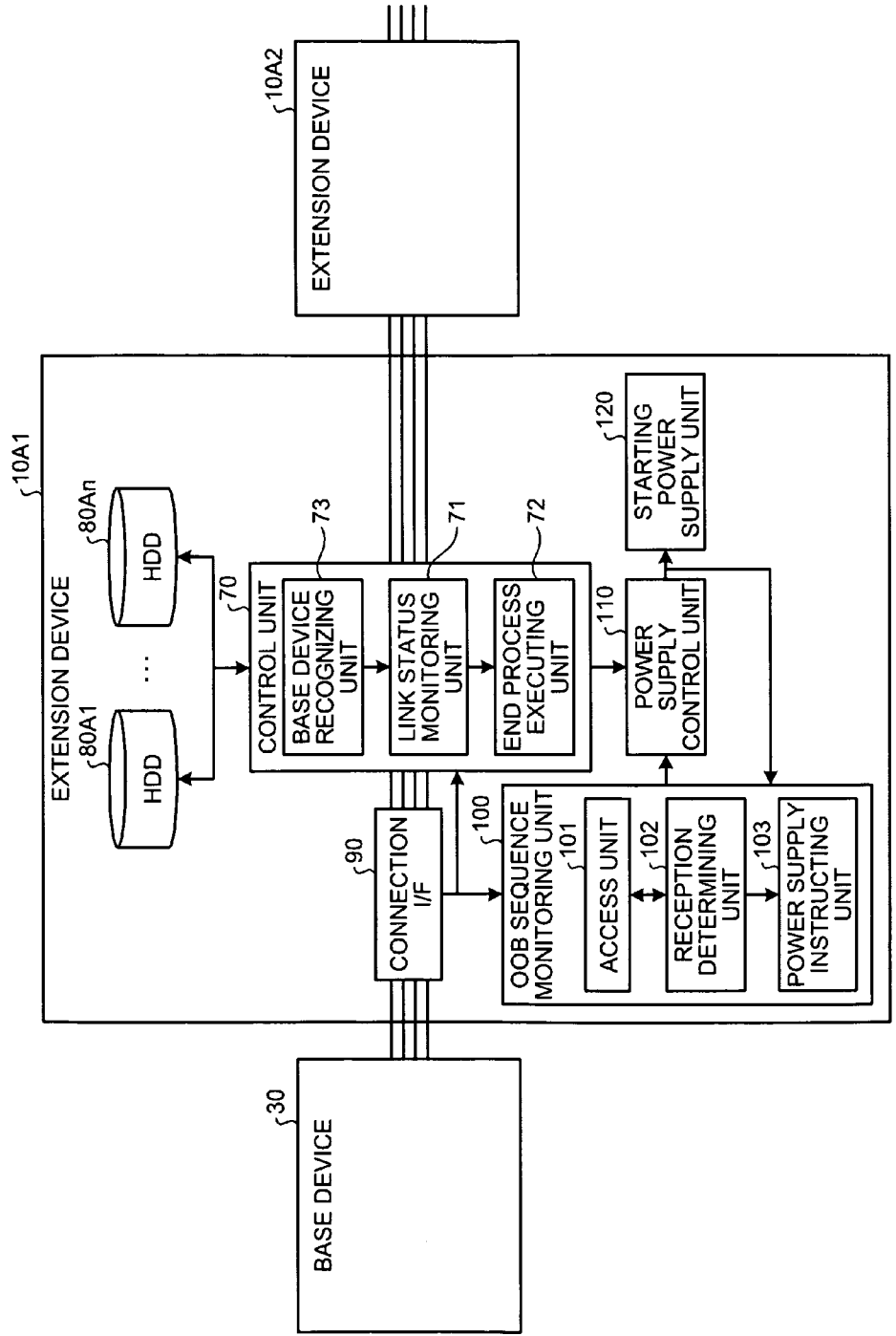
FIG. 7 is an explanatory view of a modification of the second embodiment.

Specifically, as shown in FIG. 7, the control unit 70 is provided with a base device recognizing unit 73, in addition to the units described in the second embodiment.

The base device recognizing unit 73 communicates with the base device 30, and if the base device 30 is a type of base device that transmits a command, controls the link status monitoring unit 71 to cause it to suspend the monitoring of the use condition of the ports.

Figure 8:
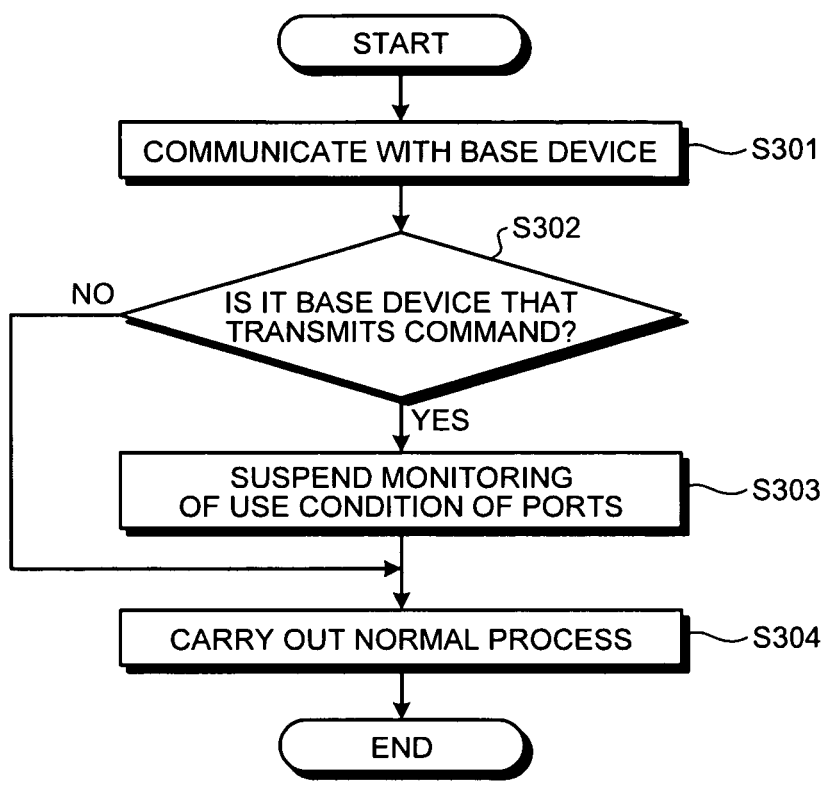
FIG. 8 is a flowchart of a flow of processes carried out by the control unit.

A processing operation carried out by the control unit 70 will be described referring to FIG. 8. A process flow of FIG. 8 is executed by the started control unit 70.

The control unit 70 communicates with the base device 30 (step S301), and determines whether the base device 30 is the type of base device that transmits a command (step S302).

When the base device 30 is the type of base device that transmits a command (Yes at step S302), the control unit 70 causes the link status monitoring unit 71 to suspend the monitoring of the use condition of the ports (step S303), and carries out a normal process (step S304).

The control unit 70 may have a monitoring resuming control unit that resumes monitoring of the use condition of the ports. Specifically, when the monitoring resuming control unit receives a control signal giving an instruction to resume monitoring from the base device 30, the monitoring resuming control unit controls the link status monitoring unit 71 to cause it to resume the monitoring of the use condition of the ports.

Next, a monitoring status control unit will be explained.

When the extension devices have the function described in the second embodiment, a hardware failure, etc., in any one of the extension devices leaves the ports of the connection I/F of a subordinate extension device unoccupied. As a result, the control unit starts the end process, which causes the controls units of the extension devices to follow to also start the end process in succession.

To prevent this, monitoring of the use condition of the ports may be suspended temporarily based on an instruction from the base device.

Figure 9:
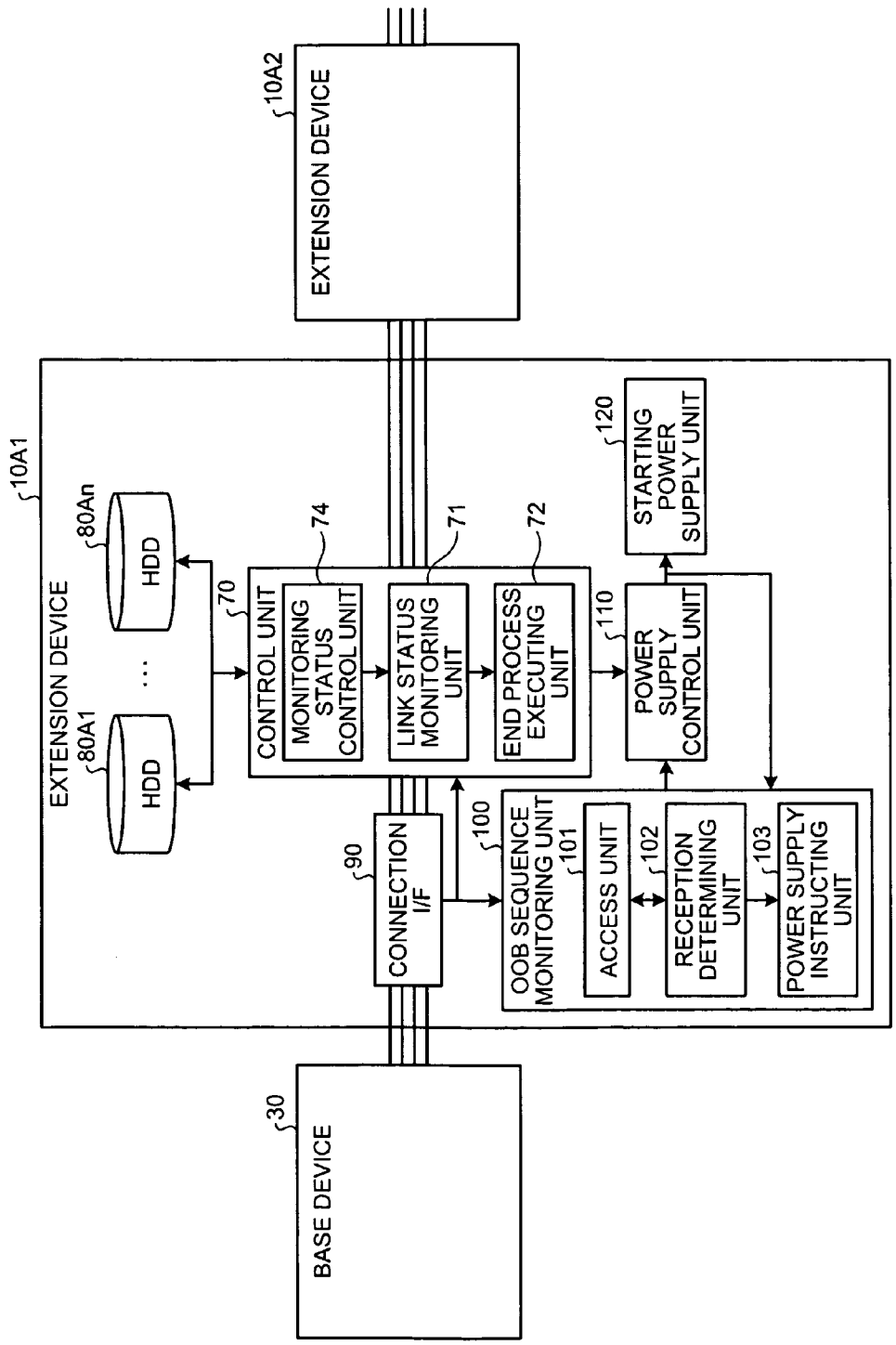
FIG. 9 is an explanatory view of a modification of the second embodiment.

Specifically, as shown in FIG. 9, the control unit 70 is provided with a monitoring status control unit 74, in addition to the units described in the second embodiment.

When receiving a control signal giving an instruction to suspend monitoring from the base device 30, the monitoring status control unit 74 controls the link status monitoring unit 71 to cause it to suspend the monitoring of the use condition of the ports.

Then, when receiving a control signal giving an instruction to resume monitoring from the base device 30, the monitoring status control unit 74 controls the link status monitoring unit 71 to cause it to resume the monitoring of the use condition of the ports.

According to the above embodiments, the start of the superior device always results in the initializing sequence carried out between the superior device and the interface. This enables the start of the storage device in operation interlocking with the start of the superior device. If subordinate devices having such a function of the storage device are connected in series to the superior device, what an operator has to do is only pressing a power switch of the superior device in the uppermost position even when the operator has to start the superior device first and then start the subordinate devices in decreasing order from the device closest to the superior device. In this manner, burden on the operator is reduced.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A storage device being connectable to a superior device via an interface that sends and receives data being read and written to a storage media, the storage device comprising:
   a power supply unit that supplies power for starting the storage device; and
   a control device, mounted in the storage device, that includes
      a communication control unit that executes an OOB sequence including a processing which exchanges information to confirm a presence or recognize a type of the interface from the superior device;
      a detecting unit that detects an execution condition of the OOB sequence executed by the control device;
      a power supply instructing unit that instructs the power supply unit to supply power for starting the storage device, based on the execution condition of the OOB sequence;
      a link-down detecting unit that detects link-down at ports used by the interface for communication with the superior device; and
      a second detection suspending unit that when receiving a prescribed command from the superior device, suspends detection by the link-down detecting unit.

2. The storage device according to claim 1, wherein the control device further includes an end process unit that carries out an end process on the storage device, based on the detection by the link-down detecting unit.

3. The storage device according to claim 2, wherein the end process unit closes a port used for communication with a subordinate device in priority.

4. The storage device according to claim 2, wherein the link-down detecting unit starts detection at a point of passage of a given time after starting to operate with power supplied from the power supply unit.

5. The storage device according to claim 1, wherein the interface includes a plurality of interface ports, and the detecting unit detects occupation in each of the interface ports to determine the execution condition of the OOB sequence.

6. The storage device according to claim 1, wherein the communication control unit exchanges a COMINIT signal in the OOB sequence, and the execution condition of the OOB sequence includes a reception condition of the COMINIT signal.

7. A storage device being connectable to a superior device via an interface that sends and receives data being read and written to a storage media, the storage device comprising:
   a power supply unit that supplies power for starting the storage device; and
   a control device, mounted in the storage device, that includes
      a communication control unit that executes a sequence including a processing which exchanges information to confirm a presence or recognize a type of the interface from the superior device;
      a detecting unit that detects an execution condition of the sequence executed by the control device;
      a power supply instructing unit that instructs the power supply unit to supply power for starting the storage device, based on the execution condition of the sequence;
      a link-down detecting unit that detects link-down at all ports used by the interface for communication with the superior device;
      an end process unit that carries out an end process on the storage device, based on the detection by the link-down detecting unit; and
      a first detection suspending unit that communicates with a superior device to determine a type of the superior device, and suspends detection by the link-down detecting unit, based on a determination result.

8. The storage device according to claim 7, wherein the control device further includes a detection resuming unit that when receiving a prescribed command from the superior device, resumes detection by the link-down detecting unit.

9. A storage device being connectable to a superior device via an interface that sends and receives data being read and written to a storage media, the storage device comprising:
   a power supply unit that supplies power for starting the storage device; and
   a control device, mounted in the storage device, that includes
      a communication control unit that executes a sequence including a processing which exchanges information to confirm a presence or recognize a type of the interface from the superior device;
      a detecting unit that detects an execution condition of the sequence executed by the control device;
      a power supply instructing unit that instructs the power supply unit to supply power for starting the storage device, based on the execution condition of the sequence;
      a link-down detecting unit that detects link-down at all ports used by the interface for communication with the superior device;
      an end process unit that carries out an end process on the storage device, based on the detection by the link-down detecting unit; and
      a second detection suspending unit that when receiving a prescribed command from the superior device, suspends detection by the link-down detecting unit.

10. The storage device according to claim 9, wherein the control device further includes a detection resuming unit that when receiving a prescribed command from the superior device, resumes detection by the link-down detecting unit.

11. A storage device being connectable to a superior device via an interface that sends and receives data being read and written to a storage media, the storage device comprising:
    a power supply unit that supplies power for starting the storage device; and
    a controller mounted in the storage device, that
    executes an OOB sequence including a processing which exchanges information to confirm a presence or recognize a type of the interface between the storage device and the superior device via the interface,
    detects an execution condition of the OOB sequence executed by the controller,
    instructs the power supply unit to supply power for starting the storage device, based on the detected execution condition of the OOB sequence,
    detects link-down at ports used by the interface for communication with the superior device, and
    suspends, when receiving a prescribed command from the superior device, detection of link-down.

12. The storage device according to claim 11, wherein the communication control unit exchanges a COMINIT signal in the OOB sequence, and the execution condition of the OOB sequence includes a reception condition of the COMINIT signal.

13. A method of starting a storage device being connectable to a superior device via an interface that sends and receives data being read and written to a storage media, the method comprising:

executing, in a controller mounted in the storage device, an OOB sequence including processing which exchanges information to confirm a presence or recognize a type of the interface between the storage device and the superior device via the interface;

detecting an execution condition of the OOB sequence executed by the controller;

instructing a power source to supply power for starting the storage device, based on the detected execution condition of the OOB sequence;

detecting link-down at ports used by the interface for communication with the superior device; and suspending, when receiving a prescribed command from the superior device, detection at the detecting link-down.

14. The storage device according to claim 11, wherein the interface includes a plurality of interface ports, and the detecting unit detects occupation in each of the interface ports to determine the execution condition of the OOB sequence.

15. A control device comprising:

a communication control unit that executes an OOB sequence including a processing which exchanges information to confirm a presence or recognize a type of an interface that sends and receives data between a first device and a second device connected to the first device via the interface, the control device being mounted in the first device;

a detecting unit that detects an execution condition of the OOB sequence;

a power supply instructing unit that instructs a power supply unit to supply power for starting the first device, based on the detected execution condition of the OOB sequence;

a link-down detecting unit that detects link-down at ports used by the interface for communication with the superior device; and a second detection suspending unit that when receiving a prescribed command from the superior device, suspends detection by the link-down detecting unit.

16. The control device according to claim 15, wherein the interface includes a plurality of interface ports, and the detecting unit detects occupation in each of the interface ports to determine the execution condition of the OOB sequence.

17. The control device according to claim 15, wherein the communication control unit exchanges a COMINIT signal in the OOB sequence, and the execution condition of the OOB sequence includes a reception condition of the COMINIT signal.

* * * * *